(12) United States Patent
Asoolin et al.

(10) Patent No.: US 12,366,523 B2
(45) Date of Patent: Jul. 22, 2025

(54) METHOD AND A SYSTEM FOR ANALYZING A SPECTRAL SIGNATURE OF A COMPOUND SPECIMEN

(71) Applicant: NewSight Imaging Ltd., Ness Ziona (IL)

(72) Inventors: Eli Asoolin, Ness Ziona (IL); Eyal Yatskan, Ness Ziona (IL); Lital Cohen-Blum, Ness Ziona (IL); Erez Lev, Ness Ziona (IL); Sara Cohen, Ness Ziona (IL); Ronen Einat, Ness Ziona (IL)

(*) Notice: Subject to any disclaimer, the term of this patent is extended or adjusted under 35 U.S.C. 154(b) by 116 days.

(21) Appl. No.: 17/998,675

(22) PCT Filed: Jul. 14, 2021

(86) PCT No.: PCT/IB2021/056366
§ 371 (c)(1),
(2) Date: Nov. 14, 2022

(87) PCT Pub. No.: WO2021/229555
PCT Pub. Date: Nov. 18, 2021

(65) Prior Publication Data
US 2023/0349820 A1  Nov. 2, 2023

Related U.S. Application Data

(60) Provisional application No. 63/024,620, filed on May 14, 2020.

(51) Int. Cl.
*G01N 21/31* (2006.01)
(52) U.S. Cl.
CPC ..... *G01N 21/31* (2013.01); *G01N 2021/3196* (2013.01)

(58) Field of Classification Search
CPC .............. G01N 2021/3196; G01N 21/31
See application file for complete search history.

(56) References Cited

U.S. PATENT DOCUMENTS

2018/0059011 A1* 3/2018 Grossmann .......... G01N 21/314

FOREIGN PATENT DOCUMENTS

CN    103487422 A  *  1/2014
KR  20000065114 A  *  6/2000
(Continued)

OTHER PUBLICATIONS

Heydar Khadem, "Classification before regression for improving the accuracy of glucose quantification using absorption spectroscopy", 2020 (Year: 2020).*

(Continued)

*Primary Examiner* — Maurice C Smith
(74) *Attorney, Agent, or Firm* — Patshegen IP; Moshe Pinchas

(57) ABSTRACT

A method for analyzing a spectral signature of a compound specimen is provided. The method includes illuminating a compound specimen with a light in a predetermined spectrum; obtaining a spectral signature of the compound specimen, the spectral signature including at least one light property of a plurality of wavelengths in the spectrum transmitted through the compound specimen; extracting characterizing features of the spectral signature, the characterizing features being light properties of predetermined wavelengths within the spectrum; and comparing the characterizing features with corresponding features stored in a database, the corresponding features are corresponding properties of an expected spectral signature of a specimen including an examined substance.

11 Claims, 8 Drawing Sheets

(56) References Cited

FOREIGN PATENT DOCUMENTS

| WO | WO-2006082042 A2 | * | 8/2006 | ............. G01N 30/72 |
| WO | WO-2007109188 A2 | * | 9/2007 | ................ G01J 3/02 |

OTHER PUBLICATIONS

Ping Liu, "The application of principal component analysis and non-negative matrix factorization to analyze time-resolved optical waveguide absorption spectroscopy data", 2013 (Year: 2013).*

* cited by examiner

METHOD AND A SYSTEM FOR ANALYZING A SPECTRAL SIGNATURE OF A COMPOUND SPECIMEN

FIELD OF INVENTION

The presently disclosed subject matter relates to method and apparatus for spectral analysis of a compound specimen in general and in particular to classification of spectral signatures of compound specimen.

BACKGROUND

Spectrophotometry is a tool that hinges on the quantitative analysis of molecules depending on how much light is absorbed by colored compounds. Spectrophotometry uses photometers, known as spectrophotometers, that can measure a light beam's intensity as a function of its color (wavelength). Important features of spectrophotometers are spectral bandwidth (the range of colors it can transmit through the test sample), the percentage of sample-transmission, the logarithmic range of sample-absorption, and sometimes a percentage of reflectance measurement.

SUMMARY OF INVENTION

There is provided according to one aspect of the presently disclosed subject matter a method for analyzing a spectral signature of a compound specimen.

The method includes illuminating a compound specimen with a light in a predetermined spectrum; obtaining a spectral signature of the compound specimen, the spectral signature including at least one light property of a plurality of wavelengths in the spectrum transmitted through the compound specimen; extracting characterizing features of the spectral signature, the characterizing features being light properties of predetermined wavelengths within the spectrum; and comparing the characterizing features with corresponding features stored in a database, the corresponding features are corresponding properties of an expected spectral signature of a specimen including an examined substance.

The characterizing features can include absorbance of the compound specimen in each one of the predetermined wavelengths, wherein the predetermined wavelengths are selected in accordance with an expected absorbance at the of predetermined wavelengths of a specimen including an examined substance.

The corresponding properties can be expected absorbance ranges in each one of the predetermined wavelengths.

Each one of the predetermined wavelengths can be selected in accordance with a difference between the expected absorbance and expected absorbance of wavelengths around each one of the predetermined wavelengths.

The method can further include preprocessing the spectral signature, including smoothing and baseline removal.

The method can further include determining a matching level between the characterizing features and the corresponding features, and detecting the examined substance in the compound specimen when the matching level exceed a predetermined threshold.

The method can further include verifying existence level of the examined substance in the compound specimen and classifying the spectral signature in accordance with the existence level.

The method can further include collecting classification data of the spectral signature and updating the corresponding features in accordance with the classification data.

The step of classifying can include collecting classification data of a plurality of spectral signatures and applying principal component analysis or partial least squares regression for determining the predetermined wavelengths in accordance with absorbance levels at the predetermined wavelengths.

The method can further include conducting a linear discriminant analysis configured for identifying a statistical model which distinct between specimen containing the examined substance and specimen which do not contain the examined substance.

There is provided according to another aspect of the presently disclosed subject matter a system for analyzing a spectral signature of a compound specimen. The system includes a plurality of devices configured for obtaining a spectral signature of compound specimen, the spectral signature including at least one light property of a plurality of wavelengths in the spectrum transmitted through the compound specimen; each one of the devices includes a controller configured for extracting characterizing features of the spectral signature, the characterizing features being light properties of predetermined wavelengths within the spectrum; a remote server for receiving the characterizing features and for comparing the characterizing features with corresponding features stored in a database, the corresponding features are corresponding properties of an expected spectral signature of a specimen including an examined substance.

Each one of the devices can include a database having the corresponding features and wherein the controller is configured for comparing the characterizing features with the corresponding features in the database.

The controller can be configured to provide an indication when a predetermined match level between the characterizing features and the corresponding features is detected.

The device can be configured to receive verifying data regarding existence of the examined substance in the compound specimen, and to send the remote server the characterizing features of the of compound specimen along with the verifying data.

The remote server can be configured to conduct classification of the characterizing features in accordance with the verifying data.

The remote server can be further configured for collecting classification data of a plurality of spectral signatures and for updating the corresponding features in accordance with the classification data.

The remote server can be further configured for applying principal component analysis or partial least squares regression for determining the predetermined wavelengths in accordance with absorbance levels at the predetermined wavelengths.

The remote server can be further configured for sending the plurality of devices updated corresponding features in accordance with the classification data, and wherein the devices are configured to save the updated corresponding features in the database.

Compound specimen, as used hereinafter in the specification and claims refers to a specimen containing compounds of molecules, chemical substances, such as liquids, or biological samples, for example serum or other substances containing viruses etc.

BRIEF DESCRIPTION OF THE DRAWINGS

In order to understand the disclosure and to see how it may be carried out in practice, embodiments will now be described, by way of non-limiting examples only, with reference to the accompanying drawings, in which.

DETAILED DESCRIPTION OF EMBODIMENTS

Figure 1A:
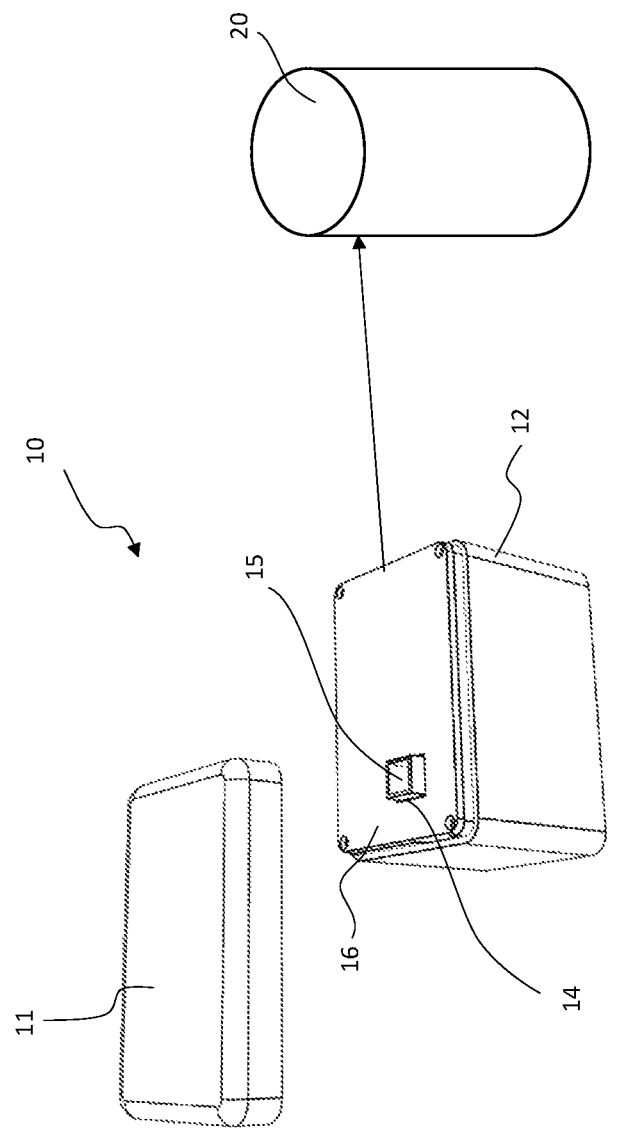
FIG. 1A is a side perspective view of a system for analyzing a spectral signature of a compound specimen.

The presently disclosed subject matter is directed to a method for analyzing a spectral signature of a compound specimen. The method includes obtaining a spectral signature of the compound, extracting characterizing features from the signature, and determining the content of the compound in accordance with the characterizing features. More specifically, the method allows detecting the existence of certain molecules inside the compound, such as viruses, microorganisms known as pathogens or germs, or other chemical elements inside the compound.

The spectral signature includes information regarding light property of a plurality of wavelengths in a light spectrum transmitted through the compound specimen. This information can include absorption, intensity or other properties of light in various wavelength in the illuminated spectrum. The characterizing features are certain information derived from the spectral signature which indicates the existence of a certain element in the compound or a lack of such element. These characterizing features are predetermined properties in the spectral signature which are expected to appear when the compound includes a certain element. By a way of example, the characterizing features can be a certain absorption level in one or more wavelengths within the illuminated spectrum. These characterizing features are associated with an existence of a certain element inside the compound. For example, if the compound is a biological sample of serum, the characterizing features can be predetermined absorption level in one or more wavelengths which are typical for serum infected with a certain virus.

It is appreciated that the characterizing features can be a range of light properties in the spectral signature which are predetermined for a certain virus. The method thus provides a tool for analyzing compounds and detecting elements in the compound by detecting expected features in the spectral signature of the compound. Obviously, the spectral signature is affected by many variables, and for similar compounds including the element under investigation, such as a virus, the obtained spectral signature may not be identical. For that, the method includes detecting characterizing features of the spectral signatures, e.g. absorption level for certain wavelengths, or a range of absorption levels, or a pattern within the spectral signature.

It is appreciated that for each type of analysis, it is required to predetermine the characterizing features which are expected to be detected in the spectral signature. I.e., the characterizing features may depend on the compound as well on the element which is being detected within the compound. In other words, for instance, if the compound is a serum specimen and the analysis aim to detect viruses in the serum specimen, characterizing features must be predetermined for each virus. For the sake of simplicity, the features which are expected to be found in a specimen having the elements under investigation, will be referred to hereinafter as corresponding features.

Figure 1B:
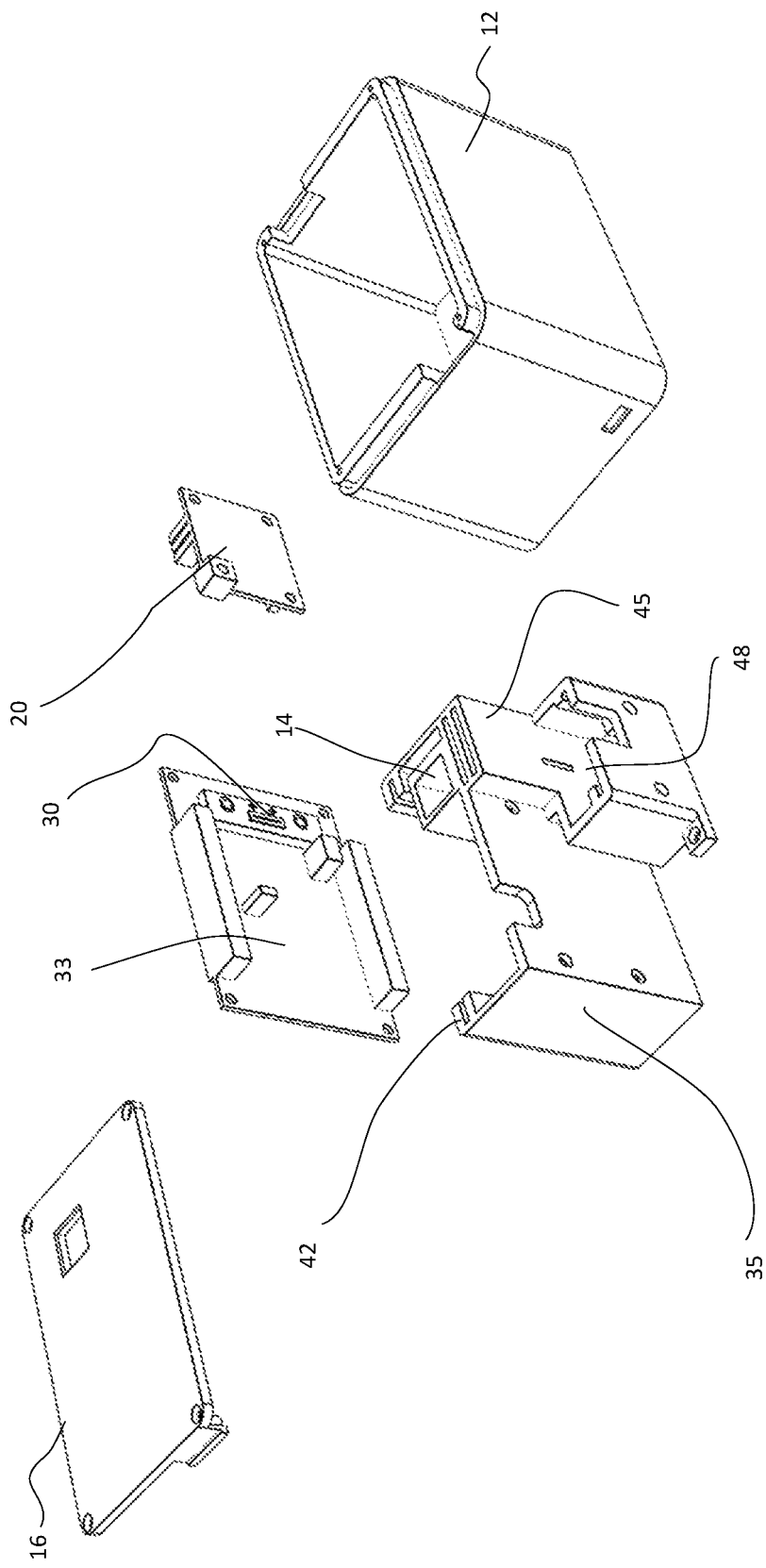
FIG. 1B is an exploded view of the device shown in FIG. 1A.

According to an example, the spectral signature is obtained with a device for spectral analysis, such as described in the co-pending patent application 63/021,367—"DEVICE AND METHOD FOR SPECTRAL ANALYSIS OF A COMPOUND SPECIMEN". As shown in FIGS. 1A and 1B, the device 10 can include a housing 12 having a seat 14 configured for holding therein a cuvette 15 including a compound specimen, such as biological sample, and an optical system for analyzing the biological sample. The housing further includes a top portion 16 having an aperture configured for allowing inserting the cuvette into the seat 14. The device 10 can further include a lid 11 for covering the cuvette when disposed inside the seat 14 so as to block outside light from interfering in the spectral analysis.

As shown in FIG. 1B the device includes a light source 20 disposed on a first side of the seat 14 and a detector 30 disposed on a second side of the seat 14, such that an optical path is formed between the light source 20 and the detector 30. The light source 20 is configured to illuminate cuvette with light of a predetermined spectrum, the detector 30 on the other hand, is configured to detect wavelengths within the illuminated spectrum.

According to the illustrated example, the detector 30 includes a band pass filter, such as a linear variable filter, disposed along the array of pixels and being configured to filter various wavelengths of the spectrum. The filter is configured such that each of the pixels on the array of pixels receives light of a certain wavelength or bandwidth.

In addition, the device 10 can further include an optical guiding member 45 for directing the illumination from the light source to the seat 14 and the cuvette. The optical guiding member 45 is configured to form an even and orthogonal illumination, such that the cuvette is evenly illuminated, and reflections are precluded. According to the illustrated example, the optical guiding member 45 includes an array of blocking walls each having an elongated slits, extending along the length of the cuvette. This way, light arrays which are not directed orthogonally to the cuvette are blocked by one of the blocking walls. The optical guiding member 45 thus provides an evenly distributed illumination along the cuvette.

As shown in FIG. 1B, according to an example the device is provided with a replaceable insert 35 defining the seat 14 for the cuvette 15, a light source seat 48 for holding the light source 20 and a PCB seat 42 for holding a PCB 33 having the detector 30 embedded therein. The replaceable insert 35 further defines the optical guiding member 45. The replaceable insert 35 allows replacing the light source 20, or the PCB, without having to change the entire device. This way, the device can be easily adapted for various spectral analysis, by replacing the light source and/or the detector to meet the needs of any spectral analysis.

According to an example, the device can include a controller for analyzing the spectral signature, i.e. for extracting the characterizing features and comparing the same with predetermined corresponding features. In addition, the device can include a database 20 including a plurality of corresponding features, each of which being associated with a certain compound. I.e., the database can include information regarding a plurality of corresponding features each of which being associated with a compound having a certain element. For example, the database 20 can include a plurality of corresponding features each of which expected to be detected for serum having a certain virus. This way, the device 10 can be configured for extracting the characterizing feature of a spectral signature, and to compare the characterizing feature with corresponding features stored in the database. When the characterizing feature matches one of the corresponding features, the controller can provide an indication regarding the virus associated with the marched corresponding feature.

It will be appreciated that the database 20 can be integrated in the device 10, or can be a remote database coupled to the device via a network, as explained hereinafter with respect to FIG. 4.

Figure 2:
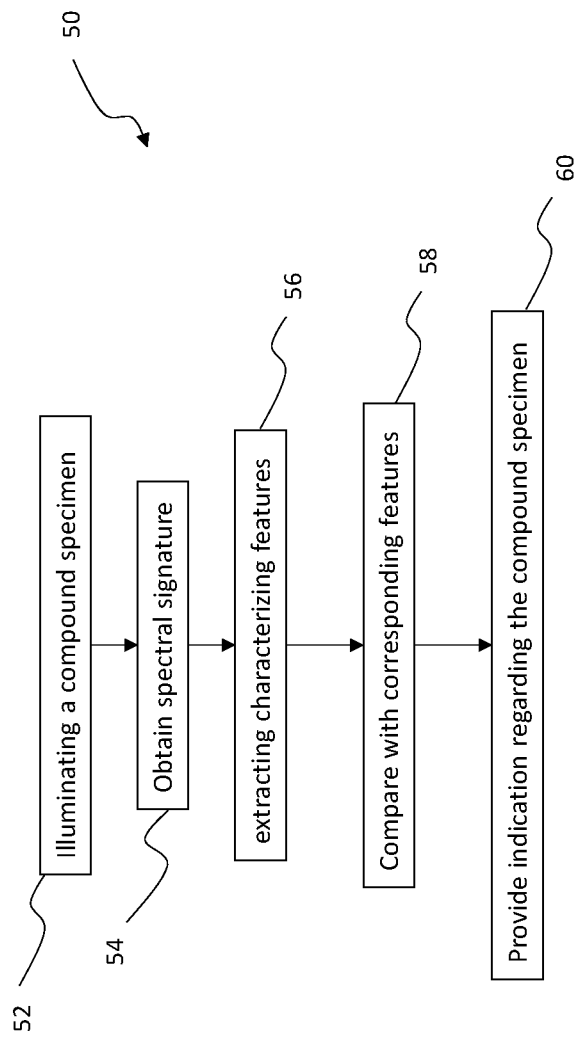
FIG. 2 is a flow chart diagram of a method for analyzing a spectral signature.

With reference to the flow chart illustration of FIG. 2, according to an example, the method 50 for analyzing the compound specimen can include illuminating a compound specimen with a certain spectrum (block 52). The spectrum can be selected in accordance with the corresponding features of the element which is to be detected. For example, for detecting viruses in a serum sample, the visible spectrum can be selected or portions of the visible spectrum. Alternatively, other spectrum can be included in the illumination, such as the infrared or ultraviolet spectrums. Next, spectral signature of the compound is obtained (block 54), for example by using the device described in the co-pending patent application 63/021,367.

Figure 3A:
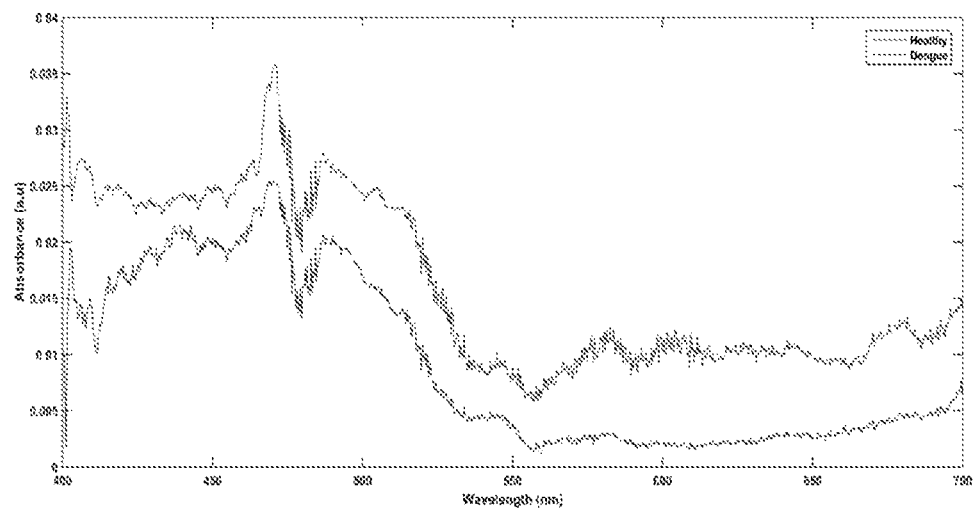
FIG. 3A is a graph illustration of a spectral signature.

In order to allow analyzing the existence of a certain element in the compound, characterizing features of the element are extracted from the spectral signature (block 56). As shown in FIG. 3A the spectral signature can be presented as a graph of light absorbance for each wavelength in a spectrum. As shown, the absorbance of serum of a healthy individual differs from the absorbance serum of an individual being infected by dengue. While it is not practical to compare each wavelength in the spectrum, certain segments of the spectrum provide substantial distinction between the two spectral signatures. Thus, according to an example, extracting the characterizing features can include preprocessing of the of the spectral signature. According to the example illustrated in FIG. 3B, the preprocessing includes cutting the spectral signature to focus on region of 425 nm-540 nm, in which a high discriminating potential is found. In addition, the preprocessing can include some manipulations on the data, such as smoothing and/or baseline removal by automatic whittaker filter, Mean Center etc.

Figure 3B:
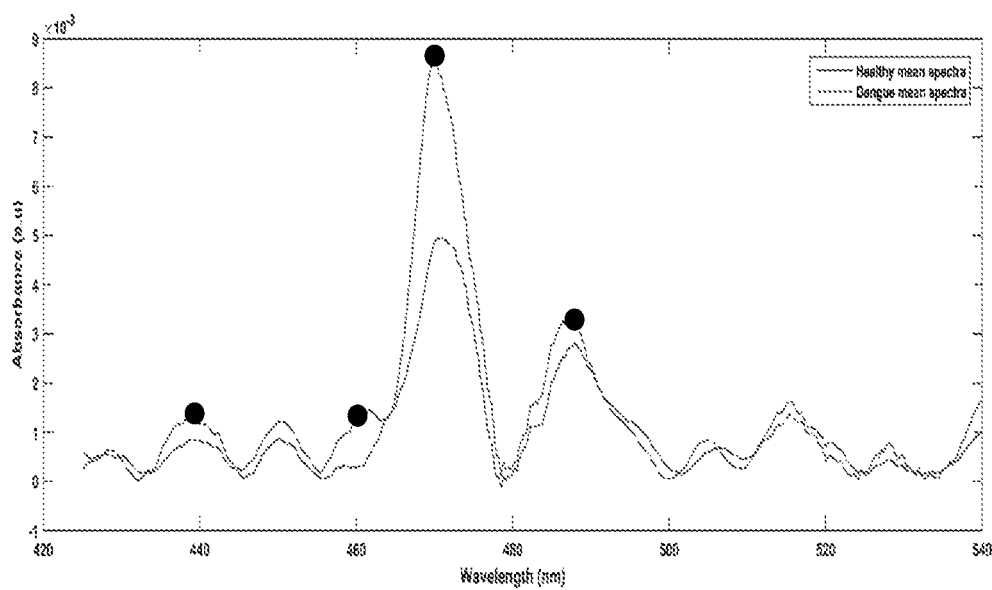
FIG. 3B is a graph illustration of the spectral signature of FIG. 3A, after preprocessing.

As shown in FIG. 3B, the characterizing features can be absorbance values at predetermined wavelengths, in which there is a significant difference between spectral signature of a sample having a virus, and spectral signature of a sample without a virus.

Finally, the characterizing features, i.e. the absorbance values at predetermined wavelengths are compared with corresponding features stored in the database (block 58). If the absorbance values are identical to the values of the corresponding features, it can be determined that the specimen includes the virus (block 60).

It will be appreciated that the characterizing features can be a set of absorbance values or a range of values, as opposed to a specific value. I.e., the absorbance values of the corresponding features can be a range indicating the existence of a virus, such that if the value of the characterizing features extracted from the spectral signature is within the range, a match can be determined. Similarly, the corresponding features can include an absorbance value for a plurality of wavelengths, and a match between the characterizing features and the corresponding features can be determine if a match between the absorbance values is found at least in some of the wavelengths. In other words, the matching rate can also be predetermined for each kind of compound and element of the compound.

According to an example, predetermination of the corresponding features as well as the matching rate can be carried out by classification methods carried out on a plurality of known specimen. I.e., analyzing spectral signatures of a plurality of specimens including the element under investigation, such as a virus, and comparing them with a plurality of specimens which do not include the virus.

The classification process can include separating the data of the spectral analysis for training the matching process to most accurately classify a specimen. The classification may include more than one method, and may include cross validation of the data, and can include sensitivity and specificity tests. For the sake of simplicity, the following explanation is directed to detection of infected specimen having a virus. It is appreciated that the same process can be applied with other compound specimen for detecting any other element in the compound.

Figure 5A:
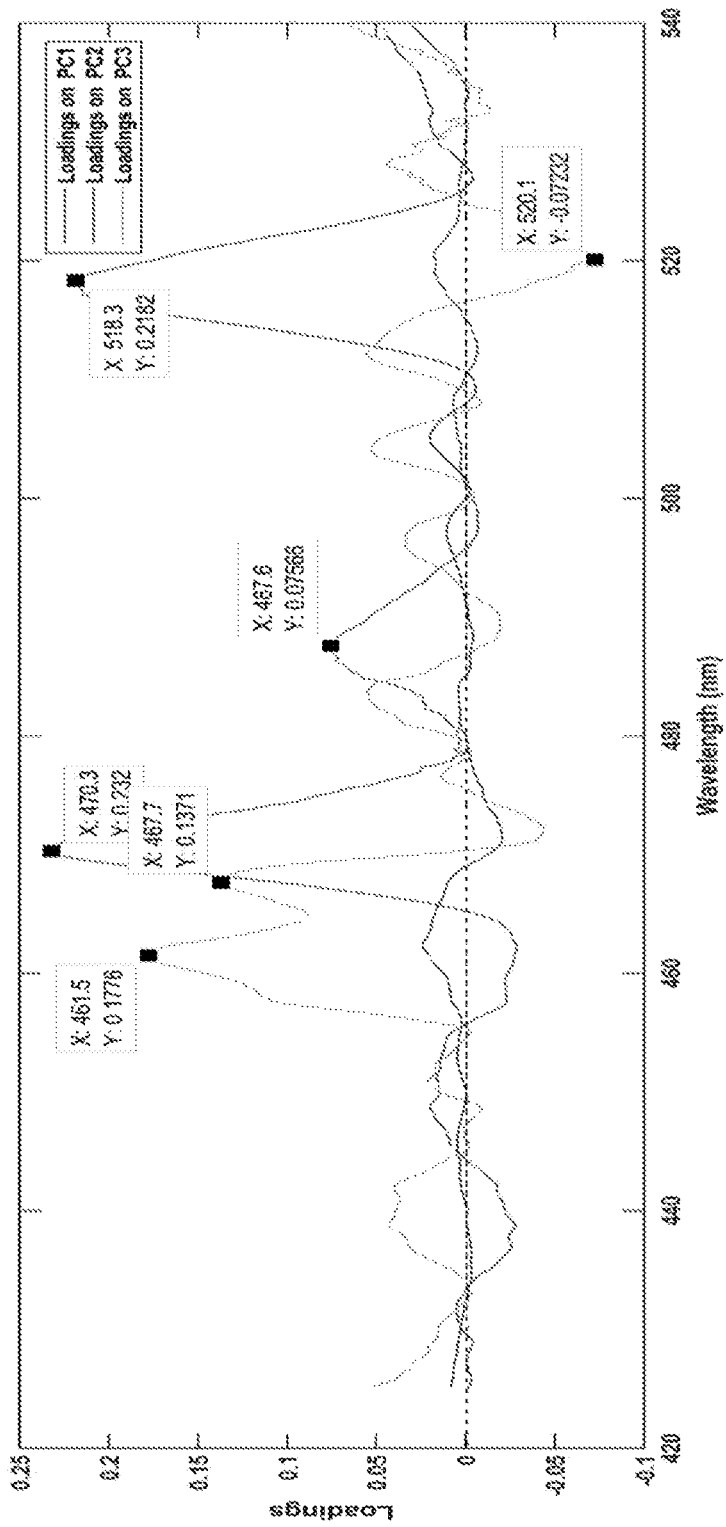
FIG. 5A is a graph illustration a principal component analysis of a plurality of spectral signatures.

According to an example, classification can be carried out by Principal component analysis with linear discriminant analysis (PCA LDA). I.e., in order to detect the wavelength which mostly indicates the existence of a virus in the specimen, the absorbance values at each wavelength in the spectrum (i.e. the spectral signature) is presented as a multi element vector. Principal component analysis is then applied on the vectors, extracting thereby the wavelengths which mostly effect the differences between the spectral signatures. I.e., as shown in the graph of FIG. 5A, each PC loading measures the variation of one of the wavelengths, facilitating thereby to detect the wavelength with the most variations.

Figure 5B:
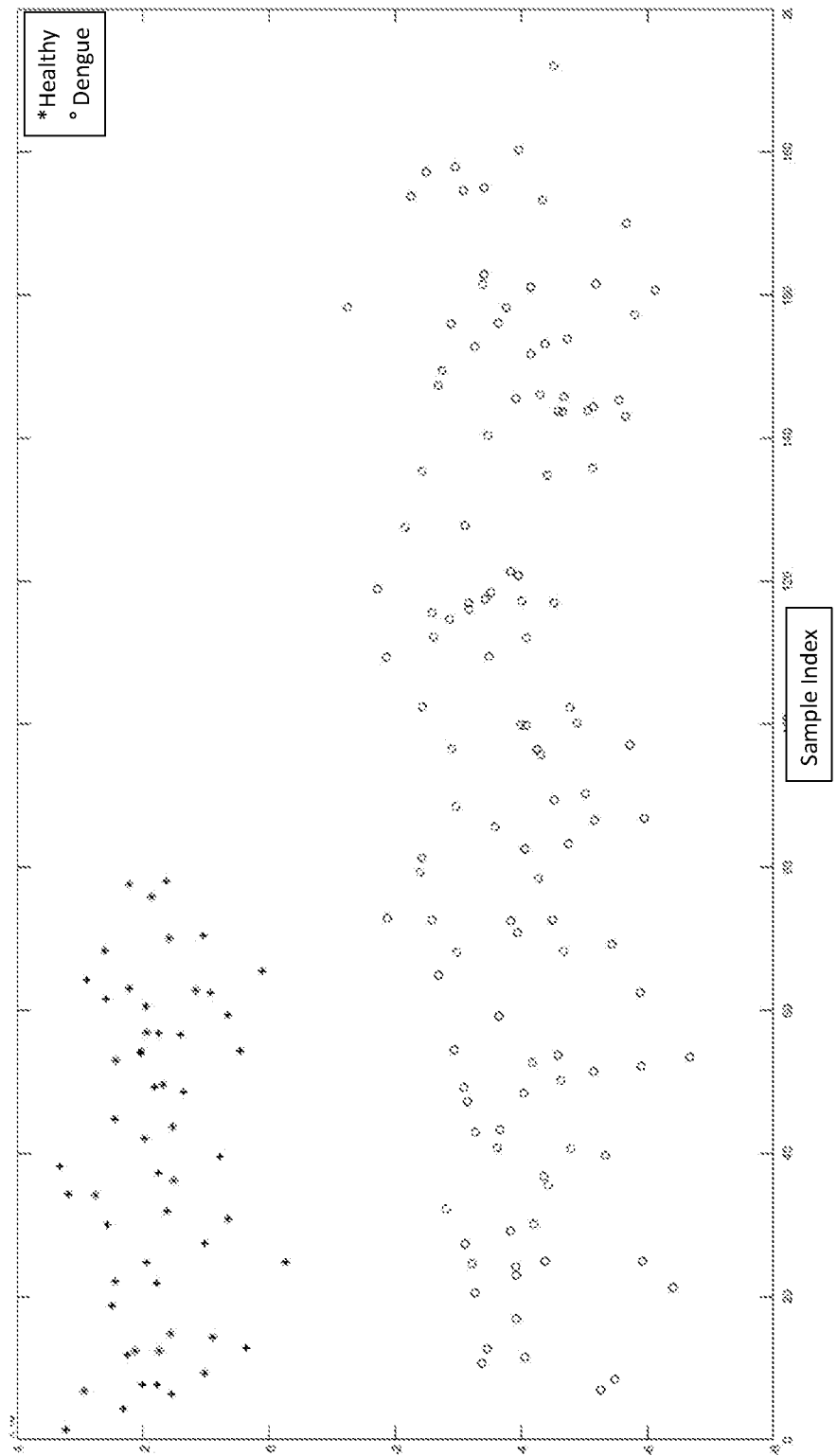
FIG. 5B is a graph illustration linear discriminant analysis of a plurality of spectral signatures; and, FIG. 6 is a flow chart diagram of a method for analyzing a conducing classification of spectral signatures.

Next, as shown in FIG. 5B, a linear discriminant analysis (LDA) is applied, in which facilitating finding a feature subspace that maximizes class separability. I.e., assisting in finding the wavelength which mostly separate between specimen containing the virus and those which do not.

It will be appreciated that other mathematical ways may be applied so as to extract the wavelengths which provides strong indication of an infected specimen. For example, Genetic Algorithm or Successive Projections with Linear, applied in conjunction with a linear discriminant analysis (LDA).

Alternatively, classification of specimen can be carried out with Support Vector Machine (SVM) which classifies the samples in high dimension plane and finds the separating boundary. It is appreciated that a plurality of classification method can be used, and reflect cross validation can be applied so as to assess accuracy of each method.

Finally, Partial least squares (PLS) regression can be applied for dimensions reduction with best separation between classes and discriminant analysis classification.

The above classification process can be carried out for determining the characterizing features and the manner in which the features are compared with the corresponding features. According to an example, the classification can be carried out when determining the required test, and the classification results can be provided to the controller of the spectral analysis device.

Figure 4:
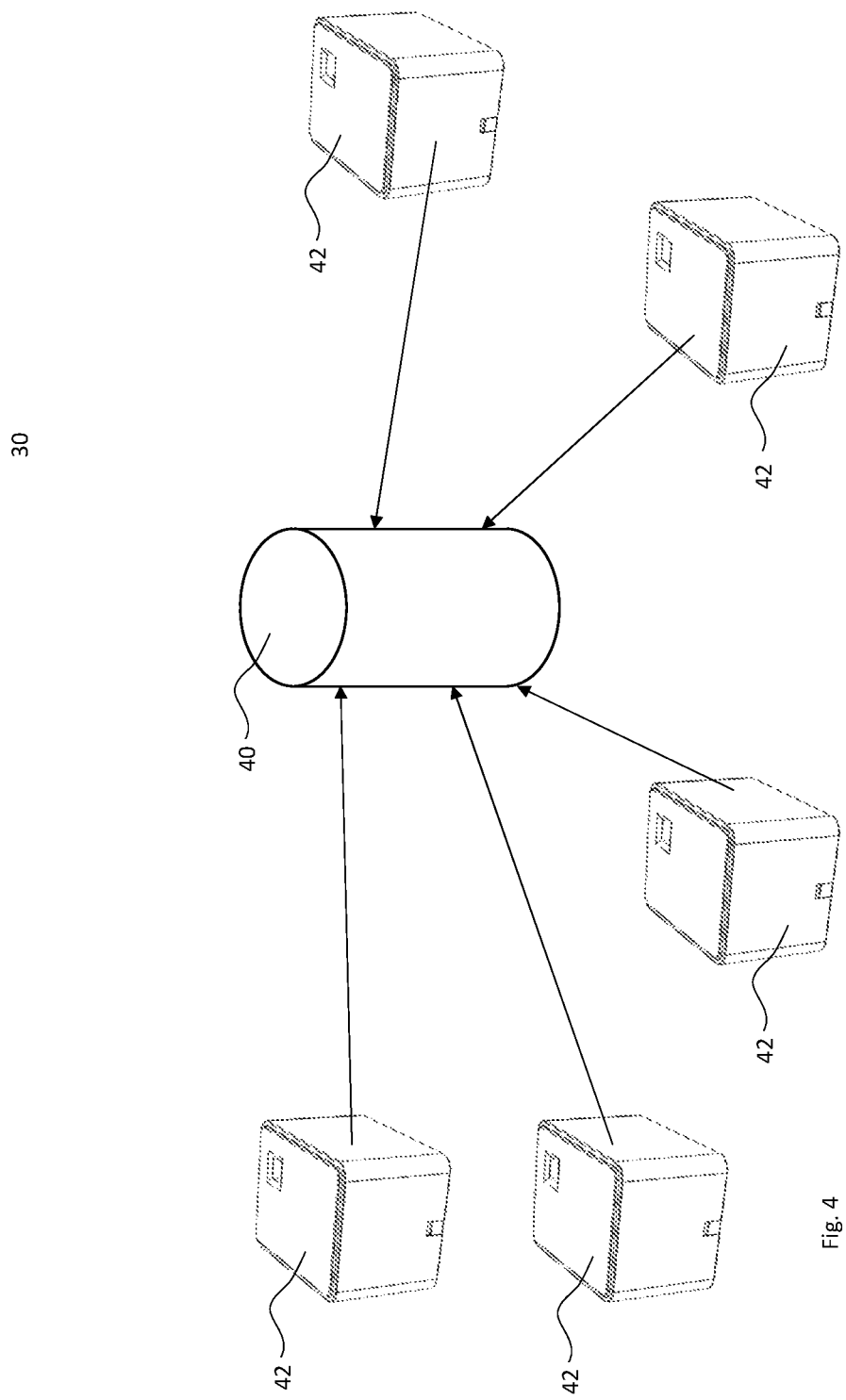
FIG. 4 is a block diagram of a system for analyzing spectral signatures by a plurality of devices as shown in FIG. 1.

As shown in FIG. 4, according to another example, the classification process can be periodically carried out in a remote server 40. The remote server 40 can be configured to receive dataset of spectral signatures from a plurality of spectral analysis devices 42. The remote server 40 can be configured for self-learning of the classification by increasing the number of spectral signatures on which the classification process is applied. This way, the classification process of infected specimen can be extended over a larger number of specimen, and by being coupled to a plurality of spectral analysis devices 42 the detection of an infected specimen can be constantly improved.

According to a further example, the spectral analysis device can be coupled to a remote server, and the comparison step of the characterizing features with corresponding features can be carried out on the remote server. The remote server can then provide feedback to the spectral analysis device regarding the specimen being analyzed.

Figure 6:
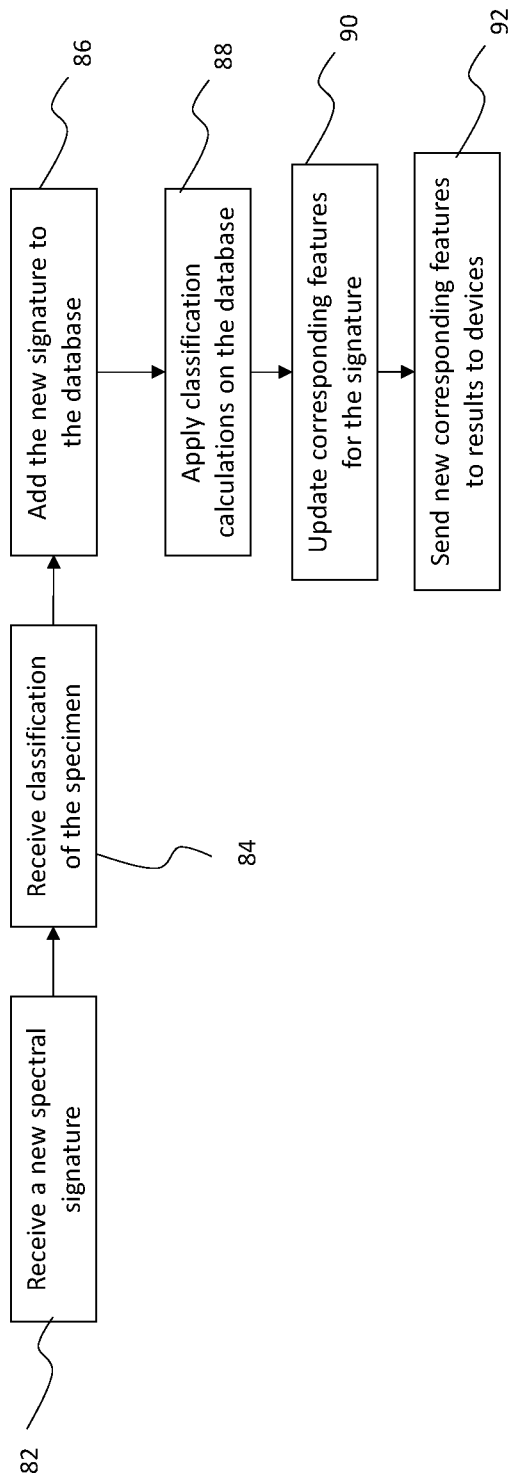

Alternatively, the comparison step of the characterizing features with corresponding features can be carried out in the devices while the classification is carried out in the remote server. As shown in the flow chart illustration of FIG. 6, the devices collect all the spectral signatures of specimen tested and periodically transmit the collected spectral signatures to the remote server (block 82). When the devices transmit the collected spectral signatures the devices also provide the classification of each specimen associated with the spectral signature (block 84). I.e., indication regarding whether or not the specimen was determined as positive or negative, for example to include a virus. It will be appreciated that such indication can be derived by relying on other tests of the specimen, so as to verify the accuracy of the spectral analysis. The remote server adds the new spectral signatures and their classification to the database (block 86).

The remote server periodically carries out the classification process on all the collected spectral signatures (block 88) and updates the corresponding features accordingly (block 90). I.e., updates the wavelengths which provide the highest variation and maximizes class separability. The remote server can then be configured to send an updated classification information to all the spectral analysis device (block 92)., i.e., the corresponding features which are to be used for detection of infected specimen.

It will be appreciated that this classification process may be repeated periodically or upon receipt of a predetermined number of new spectral signatures. I.e., the remote server can be configured to receive new spectral signature all the time, however the classification process is initiated only after a predetermined number of signatures is received. This way, the classification process is carried out and the corresponding features are updated only when enough new signatures are received such that the overall classification provides more accurate results.

Those skilled in the art to which the presently disclosed subject matter pertains will readily appreciate that numerous changes, variations, and modifications can be made without departing from the scope of the invention, mutatis mutandis.

The invention claimed is:

1. A method for analyzing a spectral signature of a compound specimen, the method comprising:
illuminating a compound specimen with a light in a predetermined spectrum;
obtaining a spectral signature of said compound specimen, said spectral signature including at least one light property of a plurality of wavelengths in said spectrum transmitted through said compound specimen;
extracting characterizing features of said spectral signature, said characterizing features being light properties of predetermined wavelengths within said spectrum;
comparing said characterizing features with corresponding features stored in a database, said corresponding features are corresponding properties of an expected spectral signature of a specimen including an examined substance;
verifying existence level of said examined substance in said compound specimen and classifying said spectral signature in accordance with said existence level; and
collecting classification data of a plurality of spectral signatures and applying principal component analysis or partial least squares regression for determining said predetermined wavelengths in accordance with light properties at said predetermined wavelengths.

2. The method according to claim 1 wherein said characterizing features include absorbance of said compound specimen in each one of said predetermined wavelengths, wherein said predetermined wavelengths are selected in accordance with an expected absorbance at said of predetermined wavelengths of a specimen including an examined substance.

3. The method according to claim 2 wherein said corresponding properties are expected absorbance ranges in each one of said predetermined wavelengths.

4. The method according to claim 3 wherein each one of said predetermined wavelengths is selected in accordance with a difference between said expected absorbance and expected absorbance of wavelengths around each one of said predetermined wavelengths.

5. The method according to claim 1 further comprising preprocessing said spectral signature, including smoothing and baseline removal.

6. The method according to claim 1 further comprising determining a matching level between said characterizing features and said corresponding features, and detecting said examined substance in said compound specimen when said matching level exceed a predetermined threshold.

7. The method according to claim 1 further comprising conducting a linear discriminant analysis configured for identifying a statistical model which distinct between specimen containing said examined substance and specimen which do not contain said examined substance.

8. A system for analyzing a spectral signature of a compound specimen, the system comprising:
a plurality of devices configured for obtaining a spectral signature of compound specimen, said spectral signature including at least one light property of a plurality of wavelengths in said spectrum transmitted through said compound specimen;
each one of said devices includes a controller configured for extracting characterizing features of said spectral signature, said characterizing features being light properties of predetermined wavelengths within said spectrum;
a remote server for receiving said characterizing features and for comparing said characterizing features with corresponding features stored in a database, said corresponding features are corresponding properties of an expected spectral signature of a specimen including an examined substance;
wherein said device is configured to receive verifying data regarding existence of said examined substance in said compound specimen, and to send said remote server said characterizing features of said of compound specimen along with said verifying data;

wherein said remote server is configured to conduct classification of said characterizing features in accordance with said verifying data;

wherein said remote server is further configured for collecting classification data of a plurality of spectral signatures and for updating said corresponding features in accordance with the classification data;

wherein said remote server is further configured for applying principal component analysis or partial least squares regression for determining said predetermined wavelengths in accordance with light properties at said predetermined wavelengths.

9. The system of claim 8 wherein each one of said devices includes a database having said corresponding features and wherein said controller is configured for comparing said characterizing features with the corresponding features in the database.

10. The system of claim 9 wherein said controller is configured to provide an indication when a predetermined match level between said characterizing features and said corresponding features is detected.

11. The system of claim 9 wherein said remote server is further configured for sending said plurality of devices updated corresponding features in accordance with the classification data, and wherein said devices are configured to save said updated corresponding features in said database.

* * * * *